United States Patent [19]

Nicholas et al.

[11] Patent Number: 5,423,457
[45] Date of Patent: Jun. 13, 1995

[54] REAL TIME TANK PRODUCT LOSS DETECTION SYSTEM

[75] Inventors: Michael P. Nicholas, Crystal Lake; Jan L. Scott, Batavia, both of Ill.

[73] Assignee: Suntronic Technology Group, Inc., Crystal Lake, Ill.

[21] Appl. No.: 56,237

[22] Filed: Apr. 30, 1993

[51] Int. Cl.⁶ .................................... G01M 3/26
[52] U.S. Cl. ........................ 222/62; 73/49.2; 141/95; 141/83
[58] Field of Search ............... 73/49.2; 222/62–66; 141/95, 83; 364/509

[56] References Cited

U.S. PATENT DOCUMENTS

| | | | |
|---|---|---|---|
| 4,353,245 | 10/1982 | Nicolai | 73/49.2 |
| 4,598,742 | 7/1986 | Taylor | 73/49.2 |
| 4,739,648 | 4/1988 | Horner | 73/49.2 |
| 4,827,762 | 5/1989 | Hasselman | 73/49.2 |
| 4,876,530 | 10/1989 | Hill et al. | 73/49.2 X |
| 5,132,923 | 7/1992 | Crawford et al. | 73/49.2 X |
| 5,170,657 | 12/1992 | Maresca et al. | 73/49.2 X |
| 5,245,869 | 9/1993 | Clarke et al. | 73/49.2 X |

*Primary Examiner*—Andres Kashnikow
*Assistant Examiner*—Kenneth R. DeRosa
*Attorney, Agent, or Firm*—Edward J. Chalfie; Jefferson Perkins

[57] ABSTRACT

A system for detecting product loss from a fluid product storage and dispensing means including at least one storage tank comprises tank volume monitoring devices, fluid dispenser monitoring devices and computer means to analyze the data from such devices at various times as determined by the status of the various elements to determine if there are unexplained shortages of product.

5 Claims, 10 Drawing Sheets

DATA ACQUISITION FILE RECORD FORMATS

IDLE TIME EVENT

IYYMMDDHHMMSS,III.II,GGGGGG,SFFF.F,WW.W<CR>

ACTIVE PERIOD START

AYYMMDDSHHMMSS<CR>

SALE EVENT

SYYMMDDHHMMSS,PP,H,GGG.GGG,III.II,GGGGGG,SFFF.F,WW.W<CR>

END OF ACTIVE PERIOD

EYYMMDDHHMMSS,III.II,GGGGGG,SFFF.F,WW.W<CR>

DELIVERY REPORT

DYYMMDDHHMMSS,GGGGGG,SFFF.F,YYMMDDHHMMSS,GGGGGG,SFFF.F<CR>

MANUAL FUEL DELIVERY

MYYMMDDHHMMSS,GGGGGG<CR>

*FIG. 8*

DATA ACQUISITION FILE EXAMPLE 1920824091500,051.36,005500,+055.3,01.2<CR>  /(TANK IDLE INVENTORY DATA)/
1920824093025,051.36,005500,+055.5,01.2<CR>

A920824093315<CR>/(START OF ACTIVITY DATE TIME)/
S920824093650,01,1,015.500<CR>/(PUMP SALE DATA)/
S920824093725,02,1,020.00<CR>
S920824093915,03,2,025.500<CR>
E920824093910,035.96,005439,+055.2,01.2<CR>   /(END OF TANK ACTIVITY DATE)/
D920824177453005,003000,+056.7,920824155032,004000,+060.4<CR>
M920824155005,003000<CR>

REAL TIME TANK PRODUCT LOSS DETECTION SYSTEM

The present invention relates in general to methods and apparatus for detecting product loss for fluid products stored in underground storage tanks, and, more particularly, to apparatus and methods for detecting the existence and type of product loss on a real time basis.

BACKGROUND OF THE INVENTION

In recent years it has become increasingly important for environmental and other reasons for operators of underground storage tanks (USTs) to monitor for leakage of the product contained therein. This is particularly important for operators of gasoline filling stations, which use many USTs, as these users have come under increasing environmental scrutiny. The United States Environmental Protection Agency (EPA) has issued strict regulations as to procedures which must be adopted by UST operators. Furthermore, there is a strong possibility of civil liability for an owner of a UST which has leaked gasoline or other chemicals into the soil and into the water table.

The EPA has approved a number of leak detection methods that can be used by UST owners. These arc monthly monitoring options, including round water monitoring, automatic tank gauging (ATG), vapor monitoring, secondary containment with interstitial monitoring, and statistical inventory reconciliation (SIR). In addition, a UST owner can use monthly inventory control with annual tank tightness testing. Regulations in several states have limited these choices further. While each of these methods has its strengths, all of them have shown many weaknesses including false alarms, requirements for tank downtime, and monitoring that is not continuous. Furthermore, these methods do not provide means to continuously check gasoline dispenser meter calibration, and a miscalibration can lead to inaccurate reports and, more importantly, can mask an otherwise detectable leak.

Historically, leak detection for a UST was performed through manual inventory control. The operator would determine the volume contained in the tank with a graduated stick, and reconcile the physical inventory with the book inventory calculated from sales and deliveries. Manual inventory control, however, proved inadequate as a leak detection system for various reasons; the minimum detectable daily leak volume depends on the accuracy of stick measurement performed by the operator. Means approved by the EPA were established to improve upon manual inventory control. The methods approved to date by the EPA use one of three basic approaches: methods to eliminate the dynamics of the process, methods that attempt to account for the dynamics of the process, and methods that look for evidence of a leak by using sensors external to the tank.

Using the basic assumption that leaks can be detected by eliminating the process dynamics, ATGs have proven to be one of the most popular methods of detection. These devices have been described in the prior art and detect leaks when they are used in a leak detection mode that requires a dormant tank. A tank-specific device for detecting leaks is shown in U.S. Pat. No. 4,972,710 to Uhlarik, et al.

A variety of techniques are used in ATGs to measure temperature and product level changes over the length of the test. Since the tank is required to be dormant for the test, any drop in tank level is assumed to be evidence of a leak. By having sufficient measurement precision for this once-a-month test, these devices can meet the EPA leak rate requirements with a two to eight hour test period. While the test time has been decreased by increased precision, the disruption of normal tank activity still causes a problem. Even a two to eight hour period once per month can be difficult to schedule in today's continuous petroleum retail operations. The net result is that the test may not be done at the 30 day schedule as required. In addition, while the 30 day cycle presents the above-mentioned operational problems, it is understandable that a leak occurring in midpoint between monthly tests could do a significant amount of damage before it is detected at the next test. Thus, it would be preferable from an environmental protection standpoint to test more often so that leaks can be detected as soon as possible.

In addition, the trade-off of decreasing measurement time by increasing precision has resulted in an increased susceptibility to secondary effects and has led to false alarms. UST owners must respond to these false alarms or face future liability problems if an actual loss occurs. Even worse, recent data have indicated that only a small percentage of installed ATGs are functioning correctly and are, in fact, giving misleading readings and reports to tank owners, leading them to have a false sense of security.

Furthermore, most devices described in the prior art measure product volume by using a sensor to determine the product height. The product level is then converted to volume by the device through a formula or table determined by the physical construction and placement of the tank. It has been found that this conversion process is frequently in error due to one or more possible problems. While the tanks are made to standard sizes, steel tanks, for example, are permitted to have a five percent (5%) volumetric variation, so the exact size of the tank is not known. This variation can cause large discrepancies in calculating the product volume based upon the measured level. An even larger error can occur when the device is misprogrammed due to inaccurate knowledge of the actual tank dimensions or through human error. Additionally, the tank may be placed in the ground tilted or it may tilt over time causing a change in the level to volume relationship. Furthermore, the tank may deform in the ground over time causing a change in the level to volume relationship. Still further, some devices use approximation methods to determine the level to volume relationship that are inherently inaccurate for certain sections of a cylindrical tank.

Another method of leak detection is known as statistical inventory reconciliation (SIR). Based on historical inventory control, SIR methods use measurements from an active system and attempt to understand the dynamic influences on that system. As compared to the ATG, increased test length is traded for the precision of each measurement. The basic technique of SIR involves using statistical analysis to analyze the difference noted when the daily physical inventory change is compared to the difference between product sold and delivered. The UST operator records sales, delivery and inventory information each day and the analysis is usually performed once every month on the last 30 days of data.

However, the dynamics of the active system under measurement may induce a multitude of errors in the collected data under this process. These errors could include improper measurement of the product level, especially if the tank level is determined manually through the use of a "stick"; errors in converting the product level to volume; data entry errors; miscalibration of dispenser meters leading to inaccurate sales information; over and under delivery of product; pilferage or other unrecorded removals of product; losses due to line leakages; and losses due to tank leakages. Current analysis algorithms must focus on identification and discrimination of these multiple effects. But because the analysis is retrospective and based on data that is essentially a series of daily gross measurements, identification of these multiple effects is difficult to confirm. As with the ATG, the 30 day test is not completely satisfactory from an environmental protection viewpoint, and a more timely test (each day, for example) would minimize losses.

For SIR methods to be effective, accurate data and consistent collection are necessary. To help, an ATG can be used to provide accurate level information, eliminating the graduated stick, while point of sale ("POS") computer systems, which generally consist of personal computers known in the prior art, can provide an electronic aid to the collection of sale and delivery information.

SUMMARY OF THE INVENTION

The primary purpose of the present invention is to improve the state of the art in underground storage tank product loss detection and to eliminate the problems inherent in both prior art stand-alone detecting devices and methods and prior art systems. The present invention is a real time, dynamic, volumetric product loss detection system combining existing POS computer technology, in-tank volume measuring probes, product delivery reports and product dispenser meters, with computer software which uses statistical analysis to analyze the data received from all these inputs to provide the operator of a fueling facility with an integrated, automated, real time system which will detect and compensate for errors in measurement regardless of the source of those errors, and which will notify the operator of problems or potential problems at an early stage.

A key to the present invention involves the comparison of data from product sales, tank levels, and delivery inputs using statistical methods. This comparison involves a systematic analysis of the trends of tank inventory shown by the various data inputs over time. Prior art systems do not provide for this coordinated analysis of data from the various parts of the product-dispensing system. The statistical methods used to analyze these data are recognized by the EPA and can be certified in accordance with "Standard Text Procedures for Evaluating Leak Detection Methods: Statistical Inventory Reconciliation Methods" (EPA/530/UST-90/007). By comparing in-tank probe measured inventory to inventory calculated from delivery and sale information, evidence of loss can be determined with a high degree of confidence. On a periodic basis, or if the system detects evidence of a loss, the system can connect and transmit data to an off-site technician or host computer for further analysis. The off-site analysis further reduces the potential of false alarms.

The invention disclosed herein has many benefits over the prior art. It is a technical advantage of this invention to provide a system which will accomplish a variety of tasks in real time, including identifying evidence of possible leakage from tanks or lines, monitoring dispenser meter calibration, monitoring the accurate functioning of in-tank probes, identifying unauthorized additions or removals of fuel product, identifying inaccurate deliveries of product, self-calibrating probe height to volume conversions to correct for inaccuracies in tank geometries or in-ground orientation, monitoring tank geometry for evidence of tank deformations, performing continuing time series analysis of sales patterns to identify secular and seasonal trends and determine optimal reorder policies and delivery configurations, and automatically providing a long term tank activity audit trail.

The present invention differs from known automatic tank gauging (ATG) systems in that it uses separate and independent measurement of product inflow and outflow in addition to tank volume information to look for evidence of a product loss. This additional information allows the product loss detection process in the proposed system to be continuously conducted in real-time without the need for system downtime.

A key element of this invention is an improvement in the product loss detection capability over prior art methods through the use of real time analysis of inputs from the various meters. A tank leak is one cause of a continuous fluid product loss. Leak detection capability is defined by the EPA in terms of three parameters: probability of detection, probability of false alarm, and leak rate detectable. As a stand-alone leak detection device, an automatic tank gauge is, in theory required by the EPA to be capable of detecting a leak of 0.2 gallons per hour with a probability of detection of at least 0.95 and probability of false alarm no greater than 0.05. In practice, however, the performance of such proposed systems is actually measured only once, under controlled laboratory conditions when certification of the system is being sought. During the life of a particular piece of equipment in the field the user has no means to determine whether, in fact, the specifications had ever been met or if they continue to be met by that piece of equipment. The only guarantee that the user has is that the design is the same as the one certified. In addition, automatic tank gauges as stand-alone leak detectors are required to be activated in a "leak detect" mode on a monthly basis only, and field experience has shown such detectors to be extremely prone to false alarm when functioning in that mode.

By contrast to prior art ATGs, the system disclosed in the present invention can be set with preset probabilities of detection and false alarms due to the statistical nature of the analytical functions being used and are thus totally independent of equipment performance, unlike prior art systems. The system of the present invention is capable of detecting very small continuous product loss amounts, such as 0.05 gallons per hour, because it functions continuously over time and is programmed to identify and correct non-leak related volume changes induced by such factors as errors in reported deliveries, pilferage or meter malfunctions. Furthermore, the product loss rate detection capability of this system is constantly being monitored and corrective action can be indicated whenever the minimum detectable product loss rate exceeds a specified rate, such as 0.05 gallons per hour.

Thus it can be seen that the present invention retains the analytical ability of statistical inventory reconciliation ("SIR") discussed above. However, through the use of automated, real time data input and analysis, this invention provides for rapid problem identification and very high resolution and depth of detail in identifying problem sources, which are not present in the prior art.

The system disclosed herein can be used with commercially available product dispensers, which can be any one of a variety of devices that meter the fuel product being dispensed and can transmit, on request, the total amount dispensed to a known POS system. A typical fueling facility would have a multiple number of such dispensers that would be interconnected through a central control device to the POS system. The exact nature of the communication exchange will vary depending on the manufacturer and type of dispenser and POS system, but can generally be characterized as involving a serial communications hardware link.

The invention disclosed and claimed herein can be used with a variety of commercially available ATGs, or in-tank monitoring systems. These in-tank monitoring systems generally consist of a probe mounted in the tank, an electronic transmission means, and a central control device. The probe will use one of several means to sense product level in that tank and will vary in construction and mounting. The probe may also be capable of measuring water contamination levels and the temperature of the product. A typical fueling facility would have a number of tanks, each with a probe, that would be connected by means of the central control device to the POS system and to the overall system. Again, the exact nature of the communication exchange will vary depending on the manufacturer and type of in-tank monitoring system, but can generally be characterized as involving a serial communications hardware link.

One of the objects of this invention is to provide a system where individual dispenser volumes are continuously correlated with tank volume change to detect miscalibration. The system is programmed to detect the patterns of inventory variance associated with all modes of tank gauge malfunction. Specifically, the tank gauge is programmed to measure height of product, rather than product volume.

The point-of-sale (POS) system's main purpose in this invention is to facilitate and record retail sales transactions. A typical point-of sale terminal differs from a traditional "cash register" in that it can perform more complex transactions, provide more detailed reports, and is able to electronically interface to a wide variety of external devices. Such POS systems more closely resemble general purpose computers and, in fact, can perform as the central data collection point and control system for most facility operations. Such a known POS system is typically capable of, but not limited to, communicating with and controlling transactions at dispensers, collecting information as required from peripheral devices such as the in-tank monitor, communicating with and using external data networks to handle credit or debit card transactions, controlling cash drawers, printing transaction receipts and management reports, and communicating with either on-site or off-site computer systems to provide activity summaries. The POS system as used in this invention may be an integrated unit that resides at the point of purchase or a distributed system that separates the point of purchase function into one hardware device and other functions into a second hardware unit.

The POS system communicates with the dispenser to collect sale volume and currency data. This data can then be used for sale transactions at the counter terminal, reporting, and analysis. In a similar fashion, the POS system communicates with the tank gauge controller to obtain information about the tank and deliveries.

As an additional check on the integrity of the tank gauge data, delivery information can be manually keyed in to the system by the facility operator from the delivery paperwork. This information is then transmitted into the system for statistical analysis and comparison to the data received from the electronic inputs.

BRIEF DESCRIPTION OF THE DRAWINGS

Further aspects of the invention and their advantages will be described from the following detailed description in conjunction with the drawings, in which like characters identify like parts and in which.

DETAILED DESCRIPTION OF THE DRAWINGS

Figure 1:
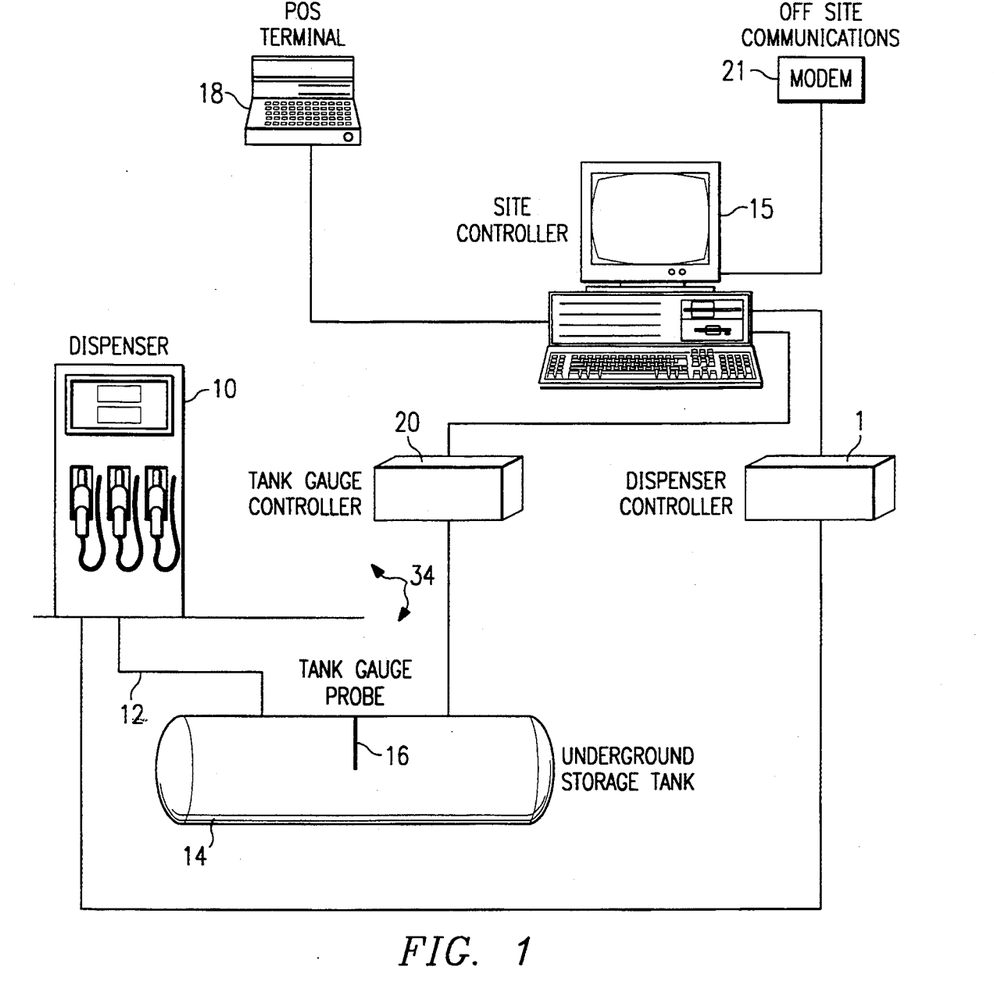
FIG. 1 is a block diagram of the physical elements of the system of the invention described herein.

FIG. 1 is a simplified block diagram of the preferred physical embodiment of the invention, as it would be installed at a retail petroleum site, to show the connection between the various elements of the system. A number of fuel product dispensers 10 would be located at the site and connected to a site controller 15 generally located in the service building (not shown). Site controller 15 may consist of a standard personal computer of a type known and described in the prior art, and which is programmed according to the invention to control and measure fuel product sales. Site controller 15 also may be connected via modem 21 to off-site communications facilities.

A dispenser controller 17 provides the interface between a plurality of dispensers 10 and a point of sale ("POS") system including POS terminal 18. The dispenser controller 17 interconnects individual dispenser signal wiring, provides electrical isolation and contains a microcontroller (not shown) to translate the dispenser communications protocol to a simpler protocol suitable for use by the POS device. Such dispenser controllers are generally known in the art and are manufactured by, for example, Tokheim.

Each dispenser 10 will be connected by underground piping or lines 12 to one or more underground storage tanks 14 for product feed stock. Each tank 14 will include at least one sensor 16, which can measure fluid level and product temperature. Each individual sensor 16 will be connected to controller 20 to form the automatic tank gauge ("ATG") system. Controller 20 is generally located in the service building. The sensors 16 which are used in the preferred embodiment of this invention are known in the art, and include those manufactured by Veeder Root. The dispensers 10 (a/k/a gasoline pumps) are widely known in the art and will not be discussed in detail herein. Such dispensers 10 generally include "on/off" handles, nozzles for dispensing product and display screens.

The Automated Tank Gauge system (ATG) indicated generally at 34, including controller 20 and probes 16, (one shown) may use a variety of techniques known in the prior art to measure the attributes, including volume and temperature, of the product in tank 14. ATG 34 may also have an additional number of additional sensors (not shown) for detecting hydrocarbon vapors in inspection wells at the site or other sensors capable of detecting hydrocarbon products in ground water. While these additional sensors may be connected to the ATG 34, they are not essential to this invention or to operation of this detection system. ATG controller 20 is generally connected to the site controller 15 through a serial communications channel, which is a standard RS232 interface.

Figure 2:
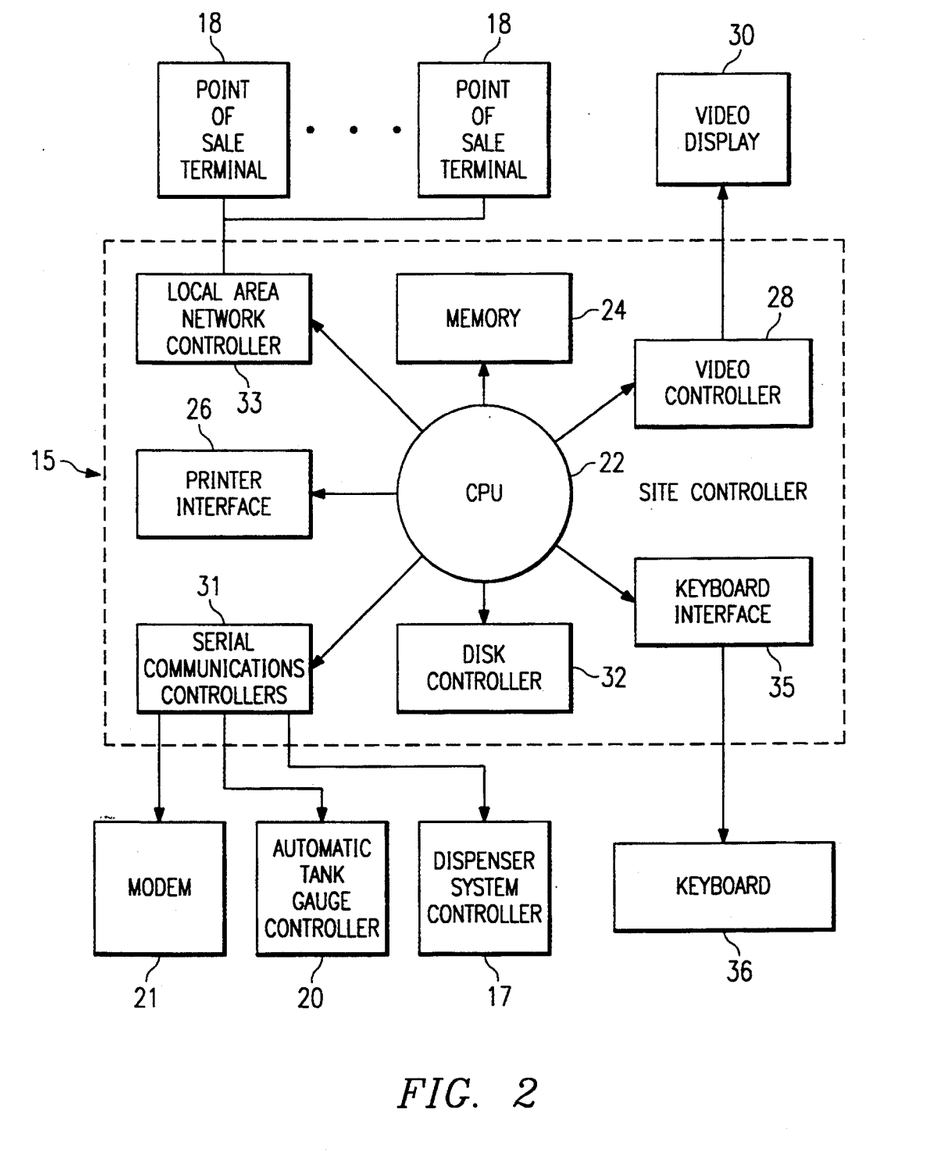
FIG. 2 is a schematic electrical block diagram of the elements of the system of the invention described herein.

FIG. 2 is a simplified block diagram of the preferred embodiment of the POS site controller 15 that performs all of the computational aspects of the system which are key to the present invention. The controller contains a central processing unit ("CPU") 22 for program execution, a memory 24 for program and short term data storage, a disk controller 32 for archival storage of data on disk, a printer interface 26, a video controller 28 for connection to a video display 30, both for presentation of results, and a serial communications controller 31, which acts as the interface between the site controller 15 to other previously mentioned components of the system, including modem 21, ATG controller 20 and dispenser controller 17. CPU 22 is also connected to a local area network controller 33, which connects to and interfaces with a series of POS terminals 18. It is the combination of these elements which enables the system of the present invention to give the operator of the system real time loss analysis. The benefits provided by this arrangement are in the ability of the system to capture and analyze data from the various elements in a coordinated manner. Prior art systems did not connect these elements, and thus did not allow for overall analysis of the data.

Figure 3:
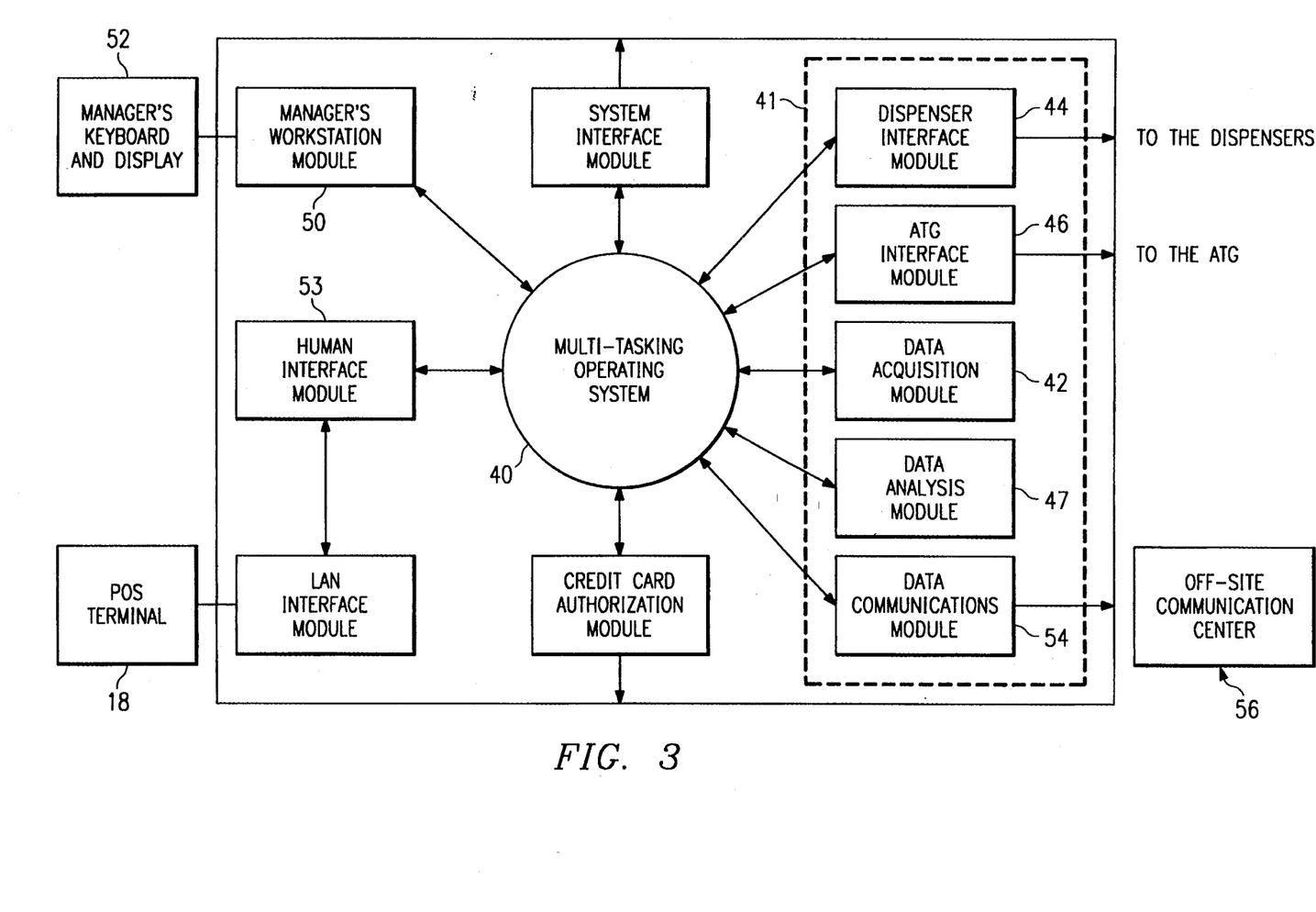
FIG. 3 is a block diagram of the operating system and related software used in the present invention.

FIG. 3 is a simplified block diagram of the overall software structure for the POS system, and reference is made herein to FIGS. 1 and 2 and the elements displayed therein. The overall operation of the system is divided into a number of separate "tasks." A real-time multi-tasking operating system 40 controls the management of these different tasks. The structure of this system provides the operator with a detailed, real-time loss analysis which is not available in the prior art systems. While FIG. 3 illustrates that many functions unrelated to loss analysis can be performed within the same environment, dotted box 41 identifies the modules that are directly involved in the tank data acquisition and analysis operation which are fundamental to this invention. Other software modules may be added as required by the operational needs of the site but such additional modules are not required by this invention.

The main purpose of dispenser interface module 44 is to control the operation of dispensers and to provide information to operating system 40 from dispensers 10 for use in processing sales of product. For the present invention, in order to incorporate this function into the loss analysis function, this task performed by dispenser interface module 44 was modified to report status change information for each dispenser 10 asynchronously to the data acquisition module 42, described below.

ATG interface module 46 provides tank inventory information from the ATG controller 17 and is normally used to provide current inventory information for the station owner or information for operational reports. For the present invention, in order to effectively use ATG interface module 46 for loss analysis, operating system 40 provides for ATG interface 46 to be queried by the data acquisition module 48 to gather tank inventory and delivery information.

Data acquisition module 42 collects dispenser and tank information from dispenser interface module 44 and ATG interface module 46 based on dispenser events and time, as described above, and places it in a disk file for later processing by a data analysis module 47. Data analysis module 47 examines the collected data on a periodic basis using statistical methods to determine if in fact there is any product shortage or any other anomalies which may indicate a leak situation. The analysis is described further below in conjunction with FIG. 11. The analysis module 47 generates a data file indicating the results of the statistical analysis of the data, provides an immediate warning to the user if a problem is detected and, depending on the severity, may place a call to an off-site alert center 56 through communications module 54. This file can later be read by the site manager's work station module 50 for display or printing, and this information is accessed via keyboard and display 52, thus giving the system operator a real time report on any possible product loss in the system.

One of the keys to this invention is in the connection of dispenser interface module 44 and ATG interface module 46 with data acquisition module 42, as prior art systems do not allow for communication between these elements. For example, these connections allow ATG interface module 46 to provide data acquisition module 42 with information as to when there is proper flow from the tank and the amount of product removed. Thus, data acquisition module 42 can synchronize the sampling of product level through the ATG system 34 so that such sampling is conducted immediately after product removal. The inventory change thus measured should correspond to the amount of product dispensed. Similarly, the transmittal of such information regarding tank activity to data acquisition module 42 allows the system to determine an appropriate quiescent period when a series of tank level samples would provide direct measurement of continuous product loss.

Figure 4:
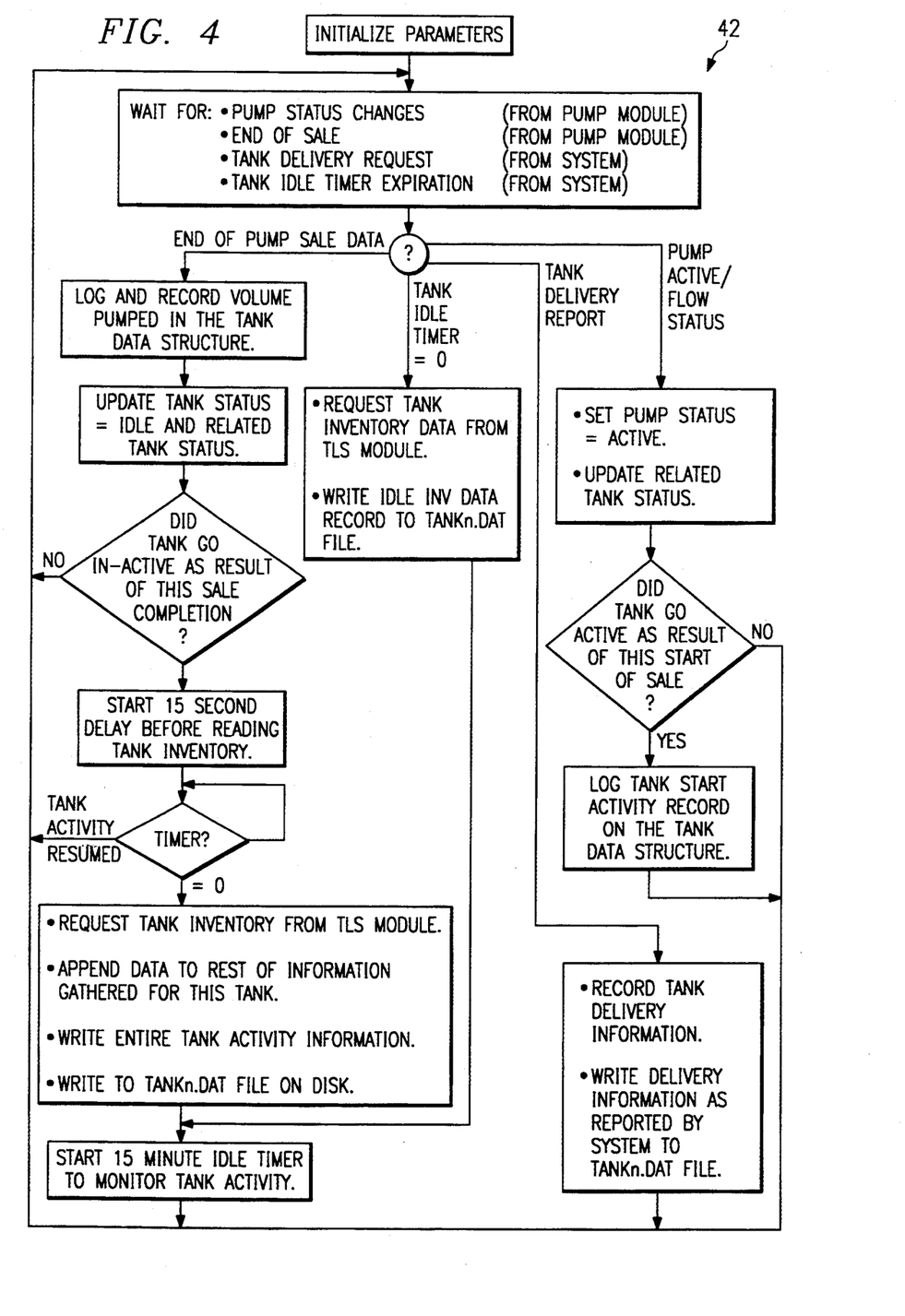
FIG. 4 is a flow chart of the steps used by the data acquisition element in the present invention.

FIG. 4 describes a simplified flow diagram of a preferred embodiment of the programming of the data acquisition module 42, demonstrating the interconnection of data acquisition module 42 and dispenser interface module 44, enabling the system to analyze the data based upon dispenser activity, and allowing for a large number of samples to be taken relative to a level change associated with the expected product loss rate, to provide a large number of samples for analysis.

Returning to FIG. 3, on a periodic basis, data analysis module 47 will review the data collected by data acquisition module 48. Various statistical methods can be used by data analysis module 47; representative ones of those are described in conjunction with FIG. 11. These statistical methods are specified to obtain results in accordance with EPA standards set forth in "Standard Test Procedures for Evaluating Leak Detection Methods: Statistical Inventory Reconciliation Methods" (EPA/530/UST 90/007).

The communication module 54 (FIG. 3) provides the means for transmitting the results of data analysis to a remote host computer at off-site communications center 56 for a review of the data if a problem is detected, and on a periodic basis to meet the requirements set forth in "Standard Test Procedures for Evaluating Leak Detection Methods: Statistical Test Procedures for Evaluating Leak Detection Methods" (EPA/530/UST-90/007). A standard asynchronous communication protocol and a standard modem may be used to accomplish this data transfer. Thus this invention provides not only for on-site loss analysis, but also for a more detailed analysis when the system believes THAT such further review of the data is necessary.

Dispenser interface module 44 is responsible for sending fuel prices to dispensers 10, tracking dispenser status changes, sending messages to dispensers 10 based on application requests from POS terminal 18, and returning dispenser status and sale information back to POS terminal 18.

Dispenser interface module 44 communicates to each of the dispensers 10 through a serial communications link, the hardware of which is commonly known in the prior art. The protocol used for such communications may be one of several types which are known in the art and which are, in general, proprietary to each manufacturer of dispensing equipment. While the protocols are proprietary, and may vary from manufacturer to manufacturer, they all allow the same types of operations to be performed and information exchanges to take place.

Figure 5:
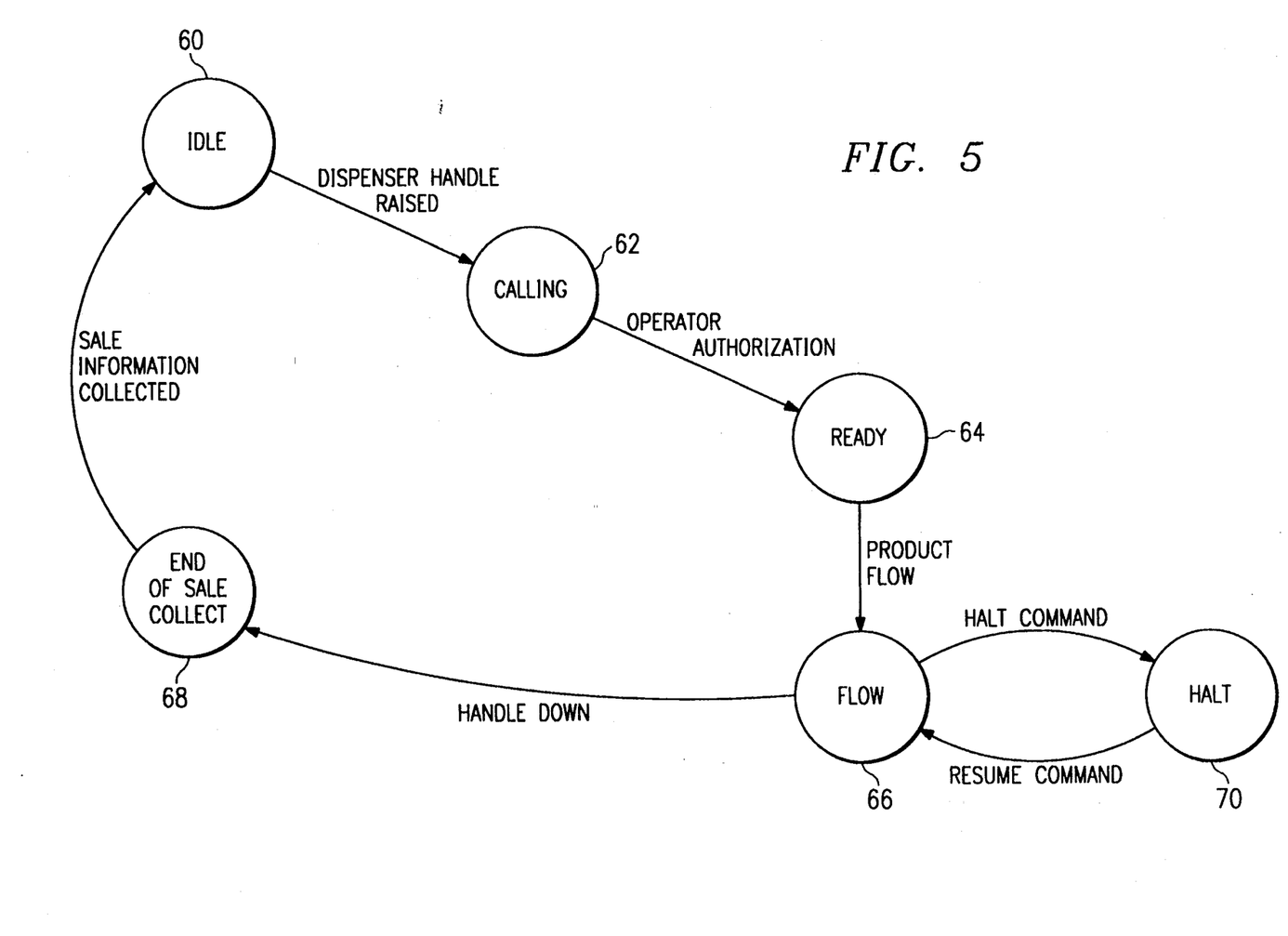
FIG. 5 is a block diagram of the various flow states of the dispensers and operating system used in the present invention.

The operation of the dispenser module 44 can be generalized using FIG. 5, a simplified dispenser state transition flow diagram. For purposes of this illustration, a single dispenser 10 is assumed. When the handle is raised on an "idle" dispenser 10, the state of dispenser 10 is changed from "idle" 60 to "calling" 62. This information is reflected on POS terminal 18 by means such as a blinking LED light on the control panel (not shown) of POS terminal 18, to alert the operator that the customer has requested service. The operator then performs an operation on POS terminal 18, depending on the implementation and the type of service requested, that will cause the proper signals to be sent to the dispenser module 44 to authorize the dispensing of product by dispenser 10.

In the preferred embodiment, the activation of an "authorization key" on POS terminal 18 causes the human interface module 53 of operating system 40 to send the proper signals to dispenser interface module 44 to cause the status of dispenser 10 to change to a "READY" state 64 after the authorization command is executed. As soon as fuel starts flowing through the nozzle of dispenser 10, the status of dispenser 10 changes to a "FLOW" state 66. The "FLOW" state 66 is asynchronously sent from dispenser 10 to data acquisition module 42. After the dispensing is stopped and dispenser 10 is turned "OFF" (e.g., when the handle is lowered), the state of dispenser 10 changes to "END OF SALE/COLLECT" 68 At this point, the volume of product dispensed is requested from dispenser 10, and sent to data acquisition module 42 along with the tank and hose information. The "COLLECT" command received from POS terminal 18 resets the dispenser 10 back to "IDLE" state 60. If delivery of fuel is temporarily interrupted by the operator through a HALT command, the systems goes to a "HALT" state 70. The module 44 reverts to a "FLOW" state 66.

Figure 6:
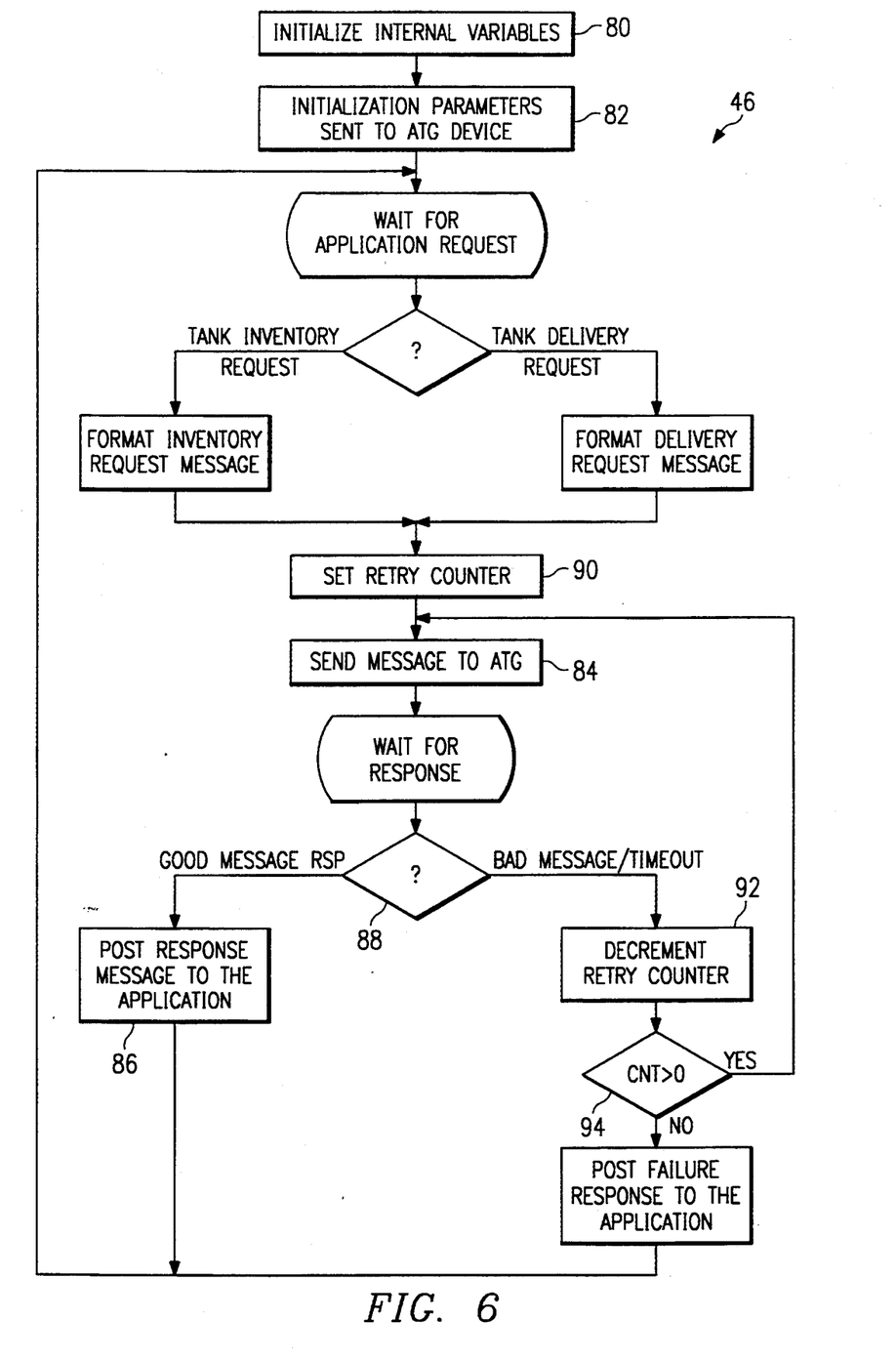
FIG. 6 is a flow chart of the steps taken in the system of the present invention for the interface between the automatic tank gauges and the operating system.

FIG. 6 illustrates a simplified block diagram of programming used in a preferred embodiment of ATG interface module 46. On powerup at block 80, certain system parameters such as date, time and number of tanks are initialized and then sent at 82 from interface module 46 to the ATG system. After successful initialization, a software loop is entered, where requests for data are received and sent to ATG controller 20. These requests can be from the user at POS terminal 18 wanting to review the current inventory or from the data acquisition module 42 asking for inventory to record as an event. The ATG controller 20 interrogates sensor(s) 16 at step 84 and returns a response at step 86 to the appropriate system module. The exact nature of the communication protocol between ATG controller 17 and interface module 20 is unique to the type of ATG equipment 34 being installed and will vary from manufacturer to manufacturer. However, they all work under the same principle of responding to commands sent by the host computer 15. In case of error detection in the received messages, or when no reply is received from sensor 16 (step 88), the command/request is retransmitted up to 3 times (steps 90, 92 and 94).

Figure 7:
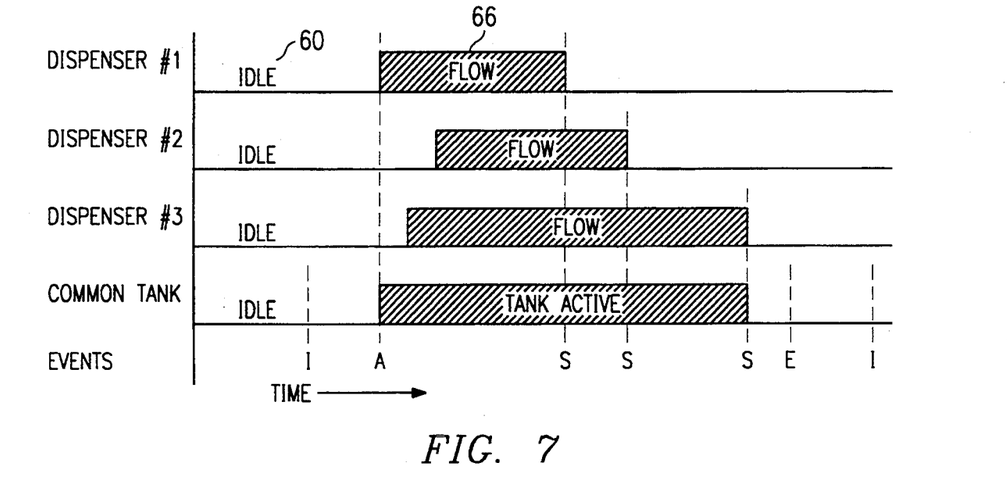
FIG. 7 is a timing diagram detailing the data acquisition algorithm used by the data acquisition element in the present invention.

FIG. 7 is a time-line illustration of the typical dynamic operation associated with a single tank 14, and the associated timing diagram based on the current sampling algorithm. Reference is made herein to elements of the invention shown in FIGS. 1-3. For this description of FIG. 7, we assume the use of a single tank 14 and a series of dispensers 10 connected to tank 14, as shown in FIG. 1. Through the functions of operating system 40, the data acquisition module 42 receives a signal from dispenser interface module 44 indicating that a dispenser 10 has gone into the "flow" state 66, and also indicating from which tank 14 the fuel is being dispensed.

The start of the activity period for this tank is designated by the letter "A" in FIG. 6. At this point in time, the date and time of start of activity is logged into a data structure in operating system 40. As long as tank 14 is supplying fuel to any combination of dispensers 10, tank 14 is considered to be "active." The time when the dispenser sale is completed is designated by the letter "S," at which time the dispenser sale volume and ATG information are logged along with the date and time information into the data structure. When all the dispensers 10 connected to a specific tank 14 are finished dispensing fuel, and no further activity resumes for a period of 15 seconds, tank 14 is considered to be "idle." At the end of the second interval which is designated by the letter "E," and if the tank is still inactive, the current inventory of tank 14 is requested by data acquisition module 42 via operating system 40 through ATG interface module 46, the information is received from ATG controller 20 and logged in the data file of operating system 40 along with the date and time of the measurement. As long as tank 14 remains in the "idle" state, the product level is sampled at minute intervals by the same method. This record is identified by the letter "I," indicating the "idle" time period.

Figure 8:
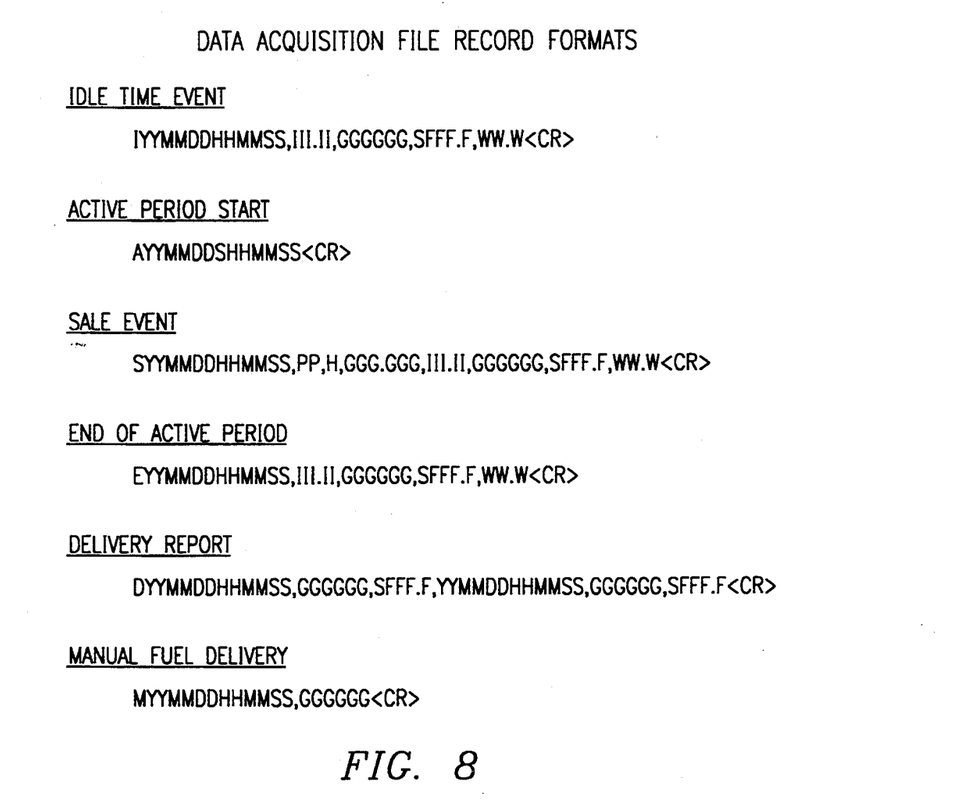
FIG. 8 illustrates additional detail specifying the nature of the data collected by the data acquisition element.

Data acquisition module 42 records the information at the specified time Intervals "I," "A," "S," and "E" in the formats illustrated in FIG. 8.

A separate file will be provided to log the tank activity information for each individual tank. Data acquisition module 42 occasionally interrogates ATG controller 20 through ATG interface module 46 for new delivery reports. In the event of new deliveries, the reports are recorded with the proper date/time as soon as they are detected. The format of the delivery report is shown in FIG. 8.

The actual volume of fuel delivered to tank 14 is also recorded by manual entry of information received from the shipper. This entry is made by the user using keyboard and display 52 through the manager's work station module 50. The information placed in the data file maintained by operating system 40 is formatted as shown in FIG. 8.

The following is an explanation of the various data file elements shown in F, 8. At the "Idle Time Event":
I indicates idle time interval.
YYMMDDHHMMSS is date and time. (e.g. 920824153225)
III.II is fuel level in inches, 2 decimal places. (e.g. 025.15)
GGGGGG is fuel volume in gallons. (e.g. 000956)
SFFFIGUREF is fuel temperature in degrees Fahrenheit with a preceding sign character S (+ or −), and one decimal place. (e.g. +037.6).
WW.W is Water level in inches with one decimal place (e.g. 03.5).

At the "Active Period Start":
A indicated start time Activity interval.
YYMMDDHHMMSS is date and time. (e.g. 920824153225)

At the "Sale Event":
S indicates sale termination and end of pump activity period.
YYMMDDHHMMSS is the date and time stamp when pump sale ends.
PP is the pump number (PP=01,02,03 . . . 24).
H is the Hose number (1,2,3).
GGG.GGG is the total # of gallons of fuel dispensed, with 3 decimal places (e.g. 025.500)
III.II is fuel level in inches, 2 decimal places. (e.g. 025.15)
GGGGGG is fuel volume in gallons. (e.g. 000956)
SFFFIGUREF is fuel temperature in degrees Fahrenheit with a
preceding sign character S (+ or −), and one decimal place. (e.g. +037.6).
WW.W is Water level in inches with one decimal place (e.g. 03.5).

At the "End of Active Period":
E indicates end of active interval record.
YYMMDDHHMMSS is date and time. (e.g. 920824153225)
GGGGGG is fuel volume in gallons. (e.g. 000956)
SFFFIGUREF is fuel temperature in degrees Fahrenheit with a preceding sign character S (+ or −), and one decimal place. (e.g. +037.6).
WW.W is Water level in inches with one decimal place (e.g. 03.5).

The "Delivery Report" includes the following elements:
D indicates Delivery report record from the ATG.
YYMMDDHHMMSS,GGGGGG,SFFFIGUREF starting month, day, hour, minute, tank volume in gallons, and temperature in degrees fahrenheit for the delivery.
YYMMDDHHMMSS,GGGGGG,SFFFIGUREF ending month, day, hour, minute, tank volume in gallons, and temperature in degrees fahrenheit for the delivery.

"Manual Fuel Delivery" incorporates the following elements:
M indicates manually entered fuel delivery YYMMDDHHMMSS is the year, month, day, hours, minutes, and seconds. GGGGGG is the number of gallons.

Figure 9:
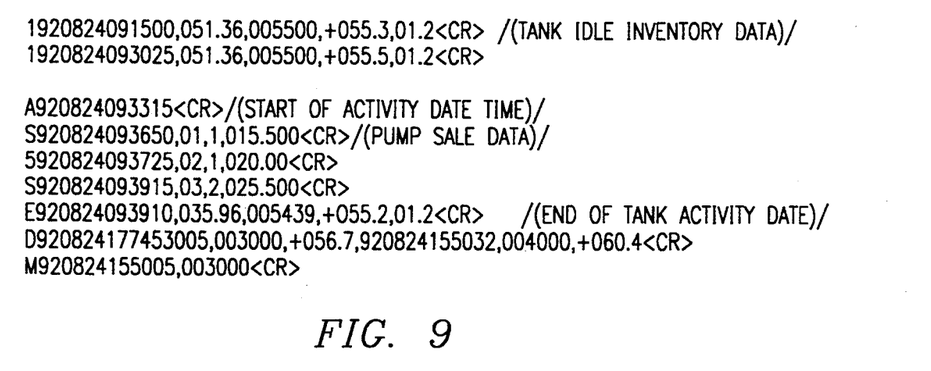
FIG. 9 is a sample data file further clarifying the nature of the data collected by the data acquisition element.

FIG. 9 outlines a typical example and illustrates the corresponding format of the data collection file. For the example shown in FIG. 9, suppose the initial fuel volume in the tank is 5500 gallons, and 51.3 inches. The initial tank temperature is 55.3 degrees. At 9:33:00AM, tank activity starts. Pumps 1, 2 and 3 are dispensing from the tank during the activity period. In addition, 3000 gallons of fuel was delivered. The records displayed in FIG. 9 represent the tank activity for this period.

Figure 10:
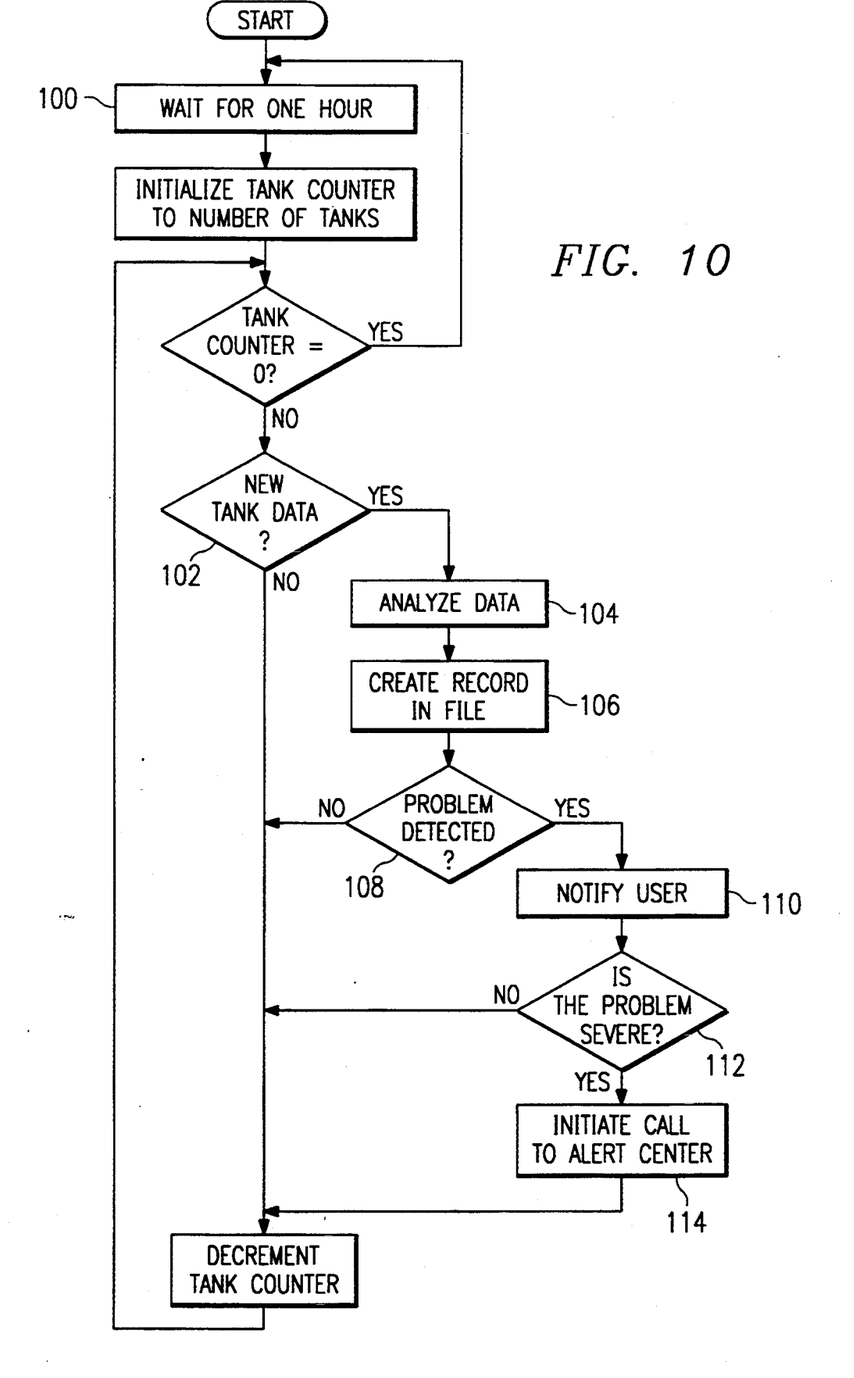
FIG. 10 is a flow chart of the steps used by the data analysis element in the present invention.

FIG. 10 illustrates a simplified block diagram of programming used in a preferred embodiment of data analysis module 47. A timer is used to periodically run the analysis once each hour. At the end of the one hour delay (step 102), a software loop is entered to analyze the data collected for each tank in turn. If there is new data available (step 102), a statistical analysis module 104 is executed. The results of the analysis returned by the statistical analysis module 104 are reviewed at 106 by the data analysis module 47 and stored as a record in a second data file. If at 108 the results of the analysis indicate a problem has occurred, the data analysis module 47 signals the user (step 110) at POS terminal 18 via operating system 40 through human interface module 53. If the severity of the problem indicates a potential loss of product (step 112), then in addition to signaling the user, a call is initiated at 114 through communications module 54 to an off-site alert center 56 to transfer the data and results for further analysis.

The present invention finds evidence of continuous product loss, not necessarily a tank leak. There is a clear difference between these two types of findings. Up to 90% of continuous product losses may be explained by events other than a leak in the underground tank. These trip events include systematic pilferage, evaporation, abraded hoses, loose fittings and line leaks. As such, when a present invention determines that there is evidence of a continuous product loss, it triggers a further investigation rather than immediate in storage tank removal.

Figure 11:
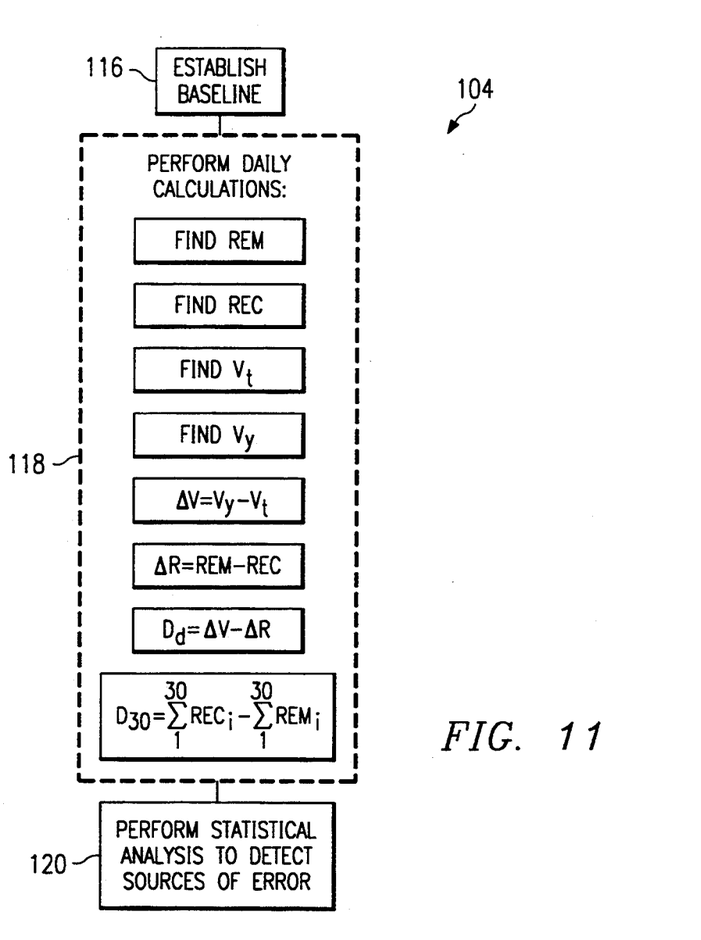
FIG. 11 is a more detailed flow chart of the data analysis step shown in FIG. 10.

FIG. 11 is a schematic representation of a flow diagram associated with the statistical analysis module, here indicated generally at 104. In analyzing the data, statistical analysis module 104 performs three basic tasks: it establishes a base line, as shown at step 106, performs daily calculations at step 108, and performs at step 120 statistical analyses on the calculation results to determine whether there is a problem, and further gives an indication as to its probable cause. The variable names accorded the quantities as illustrated in FIG. 11 may, of course, vary.

Before the system can adequately determine sources of error, it needs to learn about the normal operation of the system at step 116. The measurements received by the system will have a certain level of noise associated with them. The noise, or amount of random variation in the measured data, varies from installation to installation, and depends upon such diverse factors as tank disposition, operator measurement error, automatic tank gauge measurement error, and dispensing meter error. A base line can be established from thirty observations of data in which the system is operating normally. From this collection of observations, which may for example be collected over thirty days, certain characteristics of the operation of this system can be deduced. A mean for each of a plurality of variables is established and a standard deviation from that mean calculated. Further, periodic variations, such as those associated with tank tilt, can be shown. Beginning problems, such as serious leaks and meter miscalibrations, are determined from the base line data and these problems corrected prior to putting the system completely on-line and in an automated condition.

At step 118, at least the following daily calculations are performed. For each dispenser 10, a variable Rem is found, equivalent to the total amount of product removed using that dispenser. A variable Rec is recorded for each tank 14, and represents the total amount of deliveries received in that tank that day, as reported by a truck delivery. A variable $V_t$ is found from the automatic tank gauge system 34, representing the volume of the tank at a given point during the day. A tank volume $V_y$ is obtained from the last observation, which for example can be the day before the current day.

From these basic quantities, the following differences can be calculated. A $\Delta_v$ can be found which is equivalent to $V_y - V_t$, indicating the total change in volume of product in the tank according to ATG 34. A $\Delta_r$ can be calculated which is equal to Rem−Rec for each of the dispensers 10 and for the total number of dispensers 10 which are connected to the tank 14. A $d_d$ is determined which is equal to $\Delta_v - \Delta_r$; this theoretically should be 0 but never is. A cumulative difference, $D_{30}$, can be obtained from a sum of 30 observations of Rec minus the sum of 30 corresponding observations of Rem.

These and other variables are used at step 120 to perform certain statistical analyses to detect sources of error in a way which substantially prevents issuance of false alarms.

Each source of error has peculiar characteristics, and can be discerned from other possible sources of error by inspection of the above calculated quantities and accumulated data. Analytical methods and techniques suitable for inclusion in step 120 are described below.

Continuous Loss. Evidence of continuous, loss of which will show a $\Delta V$ which is consistently more negative than previously recorded trends. $D_d$ will show a string of negative values. The values Rem and Rec will be unchanged from their expected ranges. If as many as five daily negative values for $D_d$ show up in the data under these conditions, the probability of the occurrence of a tank leak is indicated. Further, if as many as eighteen of the last thirty $D_d$ measurements are negative, a tank leak is likewise indicated.

On this last point, it should be noted that because of the noise inherently involved in obtaining the data, $D_d$ will, on the average, be a negative value for fifteen days out of a thirty day period. However, as the number of negative values grows beyond fifteen, the probability that these negative values occurred because of noise decreases.

The data may also be inspected for periods of time greater than five days but less than thirty days, and a critical number of days in which a negative value is recorded for $D_d$ assigned by each such predetermined intermediate period. In this way, the data may be analyzed on at least a daily basis to determine the presence of a tank leak. A further method of detecting a tank leak is when the cumulative volumetric error arises out of the background noise level to such an extent that it becomes increasingly improbable that the trend is due to random noise variation.

Theft. These are typically one-time or isolated events. A theft event will be detected when an amount is removed which is at least two to three times the standard deviation away from the statistical mean. The values Rem and Rec remain the same for this cause, but $\Delta V$ shows a negative spike.

Misdelivery. When a misdelivery occurs such that less product is delivered than that shown in the delivery receipt, the value $\Delta R$ becomes more negative. Further this delivery error occurs on top of a delivery day. To cull out false alarms, the $D_d$ must be at least two standard deviations away from the mean for an alarm to occur for this reason. Misdeliveries typically are events of relatively large magnitude. Misdeliveries can also exhibit a large positive spike in $\Delta R$ and $D_d$, indicating an overdelivery. As considered over a series of observations, the $D_d$ in this instance will appear as a large offset which does not immediately return to the previous data trend.

Sticking Error. In a set of $D_d$ points over time, errors caused by the manual measurements when an operator "sticks" a tank is called sticking error. Sticking errors appear where isolated points depart significantly from the remaining points on the data curve. In a sticking error, the data once again falls back to a point near the data curve at the next measurement. It is desirable that sticking errors be perfectly random; patterns in sticking errors or the absence of sticking errors point out operational problems. For example, the absence of random sticking error indicates a "fudging" of the data by the operator, or the sticking and re-sticking of the tank by the operator until his measurement exactly coincides with $\Delta R$.

Tank Length/Chart Mismatch. In this error pattern, the daily fall in tank inventory is less than it should be, causing the difference between "stick" and "book" to be positive. When a delivery of product is made, the $D_d$ becomes sharply negative, and the data begin to trend upward once again. In a related source of error, the tank may be shorter than the tank length for which the conversion chart is provided. In this source of error, the $D_d$ trends negative as daily measurements are made. At the time that a delivery is made, there is a sharp positive peak, as it appears that more volume is being added to the tank than is actually occurring. These errors are corrected by issuing appropriate conversion charts or, in a completely automated system, supplying corrective electronic data conversion look up tables.

Automatic Tank Gauge Error. Errors of this sort show unchanged values for Rem and Rec, and may show an unchanged $\Delta V$. However, $V_y$ and $V_t$ may be consistently off from the base line data. A statistical analysis may be performed such that the cumulative values of $V_y$ and $V_t$ over a sufficient range of time show a trend which is probably caused by the tank gauge error rather than random noise variation.

One peculiar kind of ATG error is shown in a ladder effect on the $V_y$ and $V_t$ measurements, wherein sudden drops in tank volume are recorded. This can be caused, for example, by algae growth on the ATG components, such that the level on the ATG probe does not operate smoothly but drops a significant distance all at once.

Dispensing Meter Miscalibration. In errors of this kind, the amount removed is typically greater than the amount actually metered. The variable Rem is therefore larger, $\Delta R$ is larger, and $\Delta V$ stays the same. The miscalibration of a single meter, of course, will effect only the data accumulated for that dispensing meter and the tank to which it is connected. The $D_d$ calculated for a miscalibrated meter will be more negative, and should be proportional to Rem. An additional characteristic of $D_d$ in this situation is that the error will be exactly proportional to the amount of product sold or dispensed each day.

Line Leak. In this source of error, a leak has occurred between the tank 14 and the dispensing meter 10. The data will show a situation which is the inverse of a meter miscalibration. It looks like the amount metered is less than the amount actually removed. Rem will be the same, $\Delta V$ will be larger and $D_d$ will be positive. This kind of leak, as well as the meter miscalibration event, is detected by a number of positive $D_d$'s which have accumulated to such an extent that they can no longer be explained by random variation.

High Ground Water Tank Leak. Another discrepancy occurs when the tank is situated in ground having a very high water table. This will cause a data trend which looks similar to that found in a tank length/chart mismatch as discussed above, wherein the tank is longer than the length of the tank for which the conversion chart/lookup table is provided. As the massive gasoline or other product decreases, dread water seeps in through a hole in the tank, pushing the product up as water enters the tank. This will cause a positive trend in $D_d$. Then, when a delivery is made, the greater mass of the petroleum product pushes the water down and back out of the tank again. Therefore, when a positive $D_d$ trend associated with steep negative drops occurs over an observation period of, e.g., 30 days, the tank should be checked for evidence of water. If there is no water, a new chart should be provided that is suitable for the length of the tank that had actually been installed (there is variation in tank lengths occurring at some frequency, as Underwriters Laboratories allows a 5% variation on tank lengths; some tank lengths can be 12 to 18" longer than the dimension used on the supplied conversion chart). If water is shown, the site is secured from sources of above-ground water such as rain water. If this positive $D_d$ trend with negative peaks persists, it is an indication that water is leaking into the tank and that quick action should be taken.

Temperature Variations. That this source of error is greatly exaggerated in terms of its frequency, and hardly ever occurs in the field. When it does occur, a temperature-induced tank error will have a distinctly non-linear aspect.

Other statistical methods are known in the art may be employed in the analysis of the data at step 104.

Determining the cause for error is useful in that the number of calls initiated to the alert center can be greatly reduced. The alert center need be notified only, for example, when a tank leak or a line leak is indicated.

The remaining errors only require that the user be notified at step 110 (FIG. 10). Once these sources of error have been removed from the data, the data are inspected for evidence of a persistent continuous loss. The EPA mandates that operators show a loss detection system which can detect a possible leak of as low as 4.8 gallons per day; insurance companies demand 3.6 gallons per day. It has been found that using the present invention, a minimum detectible of about 1.5 gallons per day can usually be achieved, if there is sufficient accuracy in sticking other loss masking problems that are detected and removed.

Figure 12:
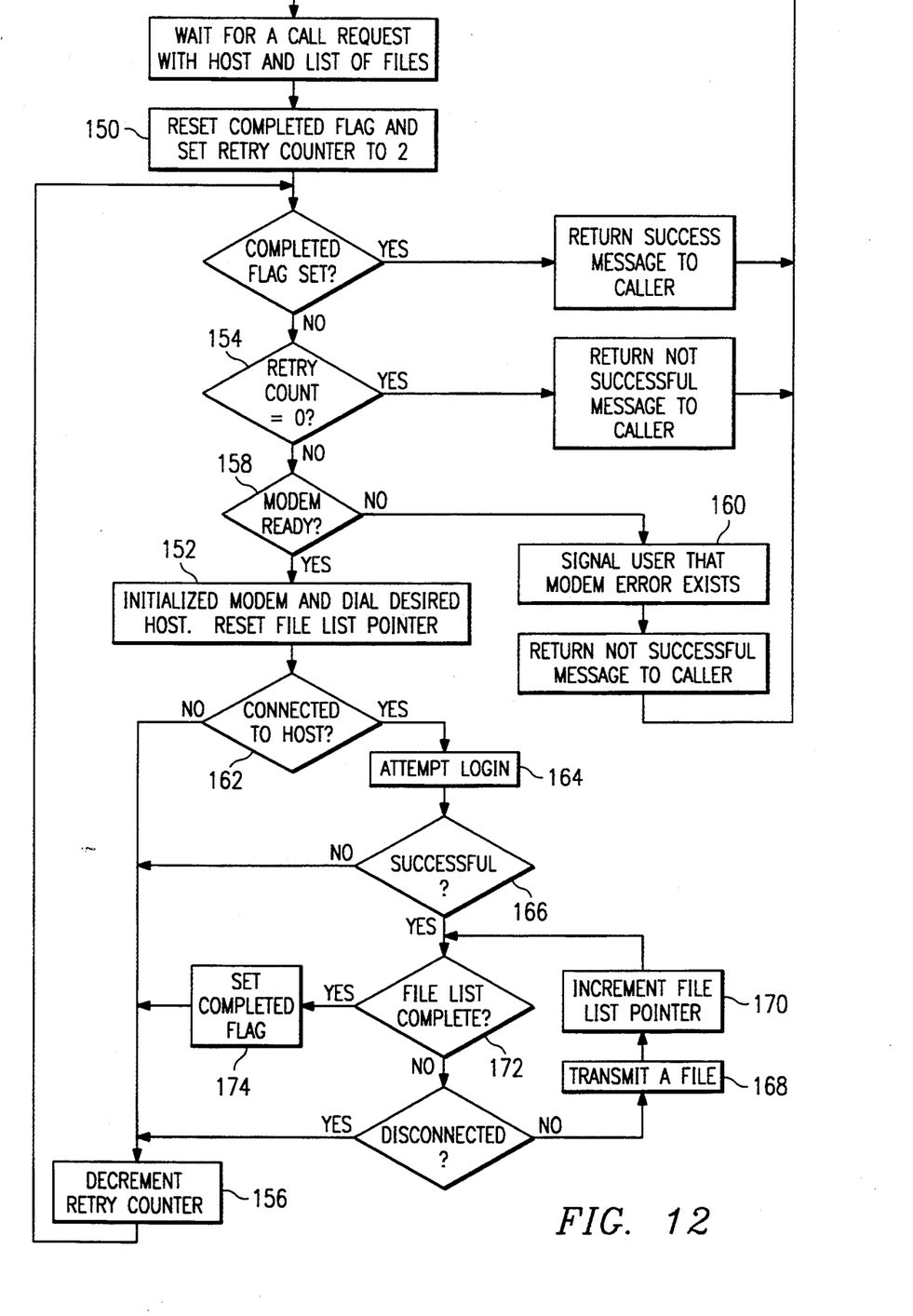
FIG. 12 is a flow chart of the steps used by the data communications element in the present invention.

FIG. 12 illustrates a simplified block diagram of programming used in preferred embodiment of communications module 54. Once a request is received from another module through services provided by operating system 40, the process begins. The process "COMPLETE" flag is reset at 150 and a counter to keep track of retries is set to the desired value. A software loop is entered to process the request by establishing a connection with the desired remote computer and transferring the specified information by means of a standard file transfer protocol (step 152). After checking to see if the process is complete by the state of the "COMPLETE" flag, the retry counter is checked. The retry counter (STEPS 154, 165) provides an escape from the loop and an error recovery mechanism in case a connection cannot be established with the desired remote computer system due to such failure as temporary phone outages and errors, modem to phone line miscues, and host computer outages.

In the preferred embodiment, modem 21 is an intelligent modem known in the prior art that is capable of returning its status and dialing phone numbers. Prior to using modem 21 to establish a connection, the system checks the modem's status at 158. If the modem is not ready, a signal is sent at 160 to the user indicating that the modem and phone line should be checked. This situation would most likely occur if the modem has lost power or there was a fault in the wiring between the site controller and modem 21.

If modem 21 is ready, then a series of characters will be sent to the modem to cause it to dial the phone number for the desired remote computer system. If the remote computer answers at step 162, the modem will return a status indicating a connection has been established. Once a connection has been established, a log in or sign in procedure is used at step 164 to identify the caller to the remote computer. If this procedure is successful (step 166), then the information transfer procedure can begin. The data files are transferred one at a time (steps 168, 170) until the list provided by the requestor has been completed (steps 172, 174).

In summary, a novel product loss detection system and method have been shown and described which use data from an automatic tank gauge probe and inventory data. The invention automatically collects these data on a frequent basis, establishes the existence of significant events which are different from the noise or variation caused by error in measurement, and makes a tentative identification as to the type of error that has occurred. Depending on the severity of the problem, the retail site operator can be notified or, in serious instances, an alert center can be called. By inspecting the data over a series of observations, tank leaks and the like can be detected with a relatively high level of sensitivity, while at the same time minimizing the number of false alarms generated and eliminating the need for testing downtime.

While the present invention has been described in conjunction with the above detailed description and the appended drawings, the invention is not limited thereto, but only by the scope and spirit of the appended claims.

We claim:

1. Apparatus for detecting product loss in a fluid product dispensing system which includes means for storing said fluid product, comprising:

means for dispensing said fluid product, said means for dispensing having an active and inactive state;

measuring means for measuring a volume of product in said means for storing said fluid product;

dispenser monitoring means for monitoring the amount of product dispensed by said dispensing means and for determining the status of said dispensing means;

means for adding additional fluid product into said means for storing;

input recording means for measuring and recording the amount of fluid product added into said means for storing;

processing means for receiving data from and communicating with said dispenser monitoring means, said measuring means and said input recording means;

analysis means for analyzing said data from said monitoring means, said measuring means and said input recording means to detect significant deviations from expected trends at any point during operation of said fluid product dispensing system to determine if there are any unaccounted shortages of fluid product from system, said analysis means being connected to said processing means for input thereto;

display means connected to said processing means for displaying results of said analysis of data during use of said fluid product dispensing system; and means coupled with said processing means to control said measurement means and the timing of the measurements of volume in said means for storing by said measuring means based upon the status of said dispenser monitoring means.

2. The apparatus for detecting product loss as set forth in claim 1, wherein said processing means instructs said measuring means to measure the fluid product in said means for storing during quiescent periods when said means for dispensing is inactive and fluid product is not being dispensed from said fluid product dispensing system.

3. The apparatus for detecting product loss as set forth in claim 1, wherein said processing means comprises a computer.

4. The apparatus for detecting product loss as set forth in claim 1, further comprising means for electronically communicating with a computer system external to said fluid product dispensing system, whereby said data from said dispenser monitoring means, measuring means and input recording means may be analyzed by said external computer system.

5. The apparatus for detecting product loss as set forth in claim 1, wherein said processing means is electronically connected to a computer terminal programmed to record retail sales transactions.

* * * * *